July 8, 1941.  W. HICKMAN ET AL  2,248,234
INDIVIDUAL MILK BOTTLE CARRIER
Filed Feb. 29, 1940  2 Sheets-Sheet 2
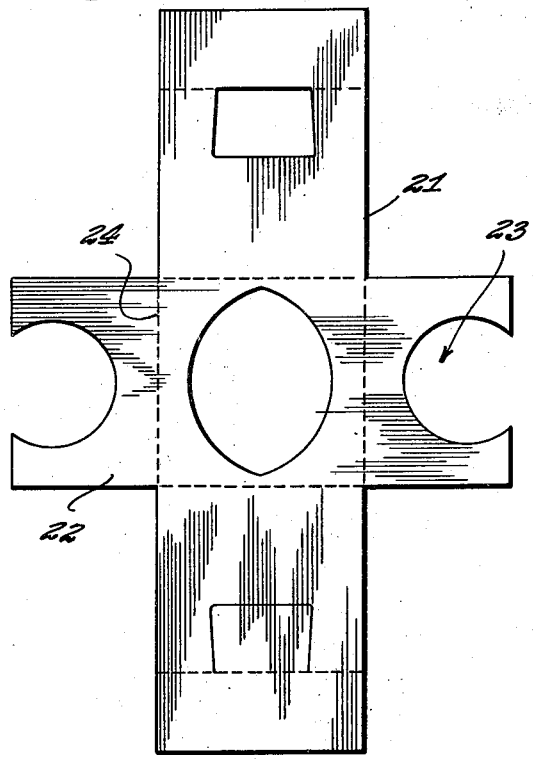
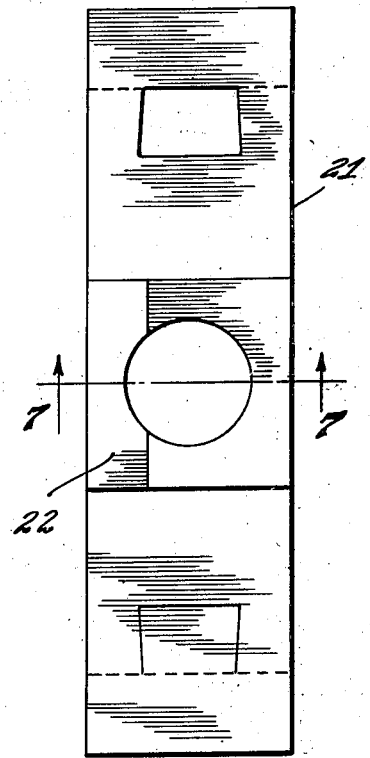
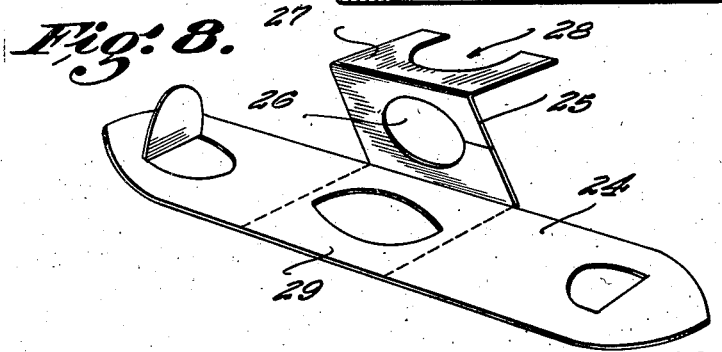
Inventors
Wenona Hickman
Laura Cossey
By Lacey & Lacey, Attorneys Patented July 8, 1941

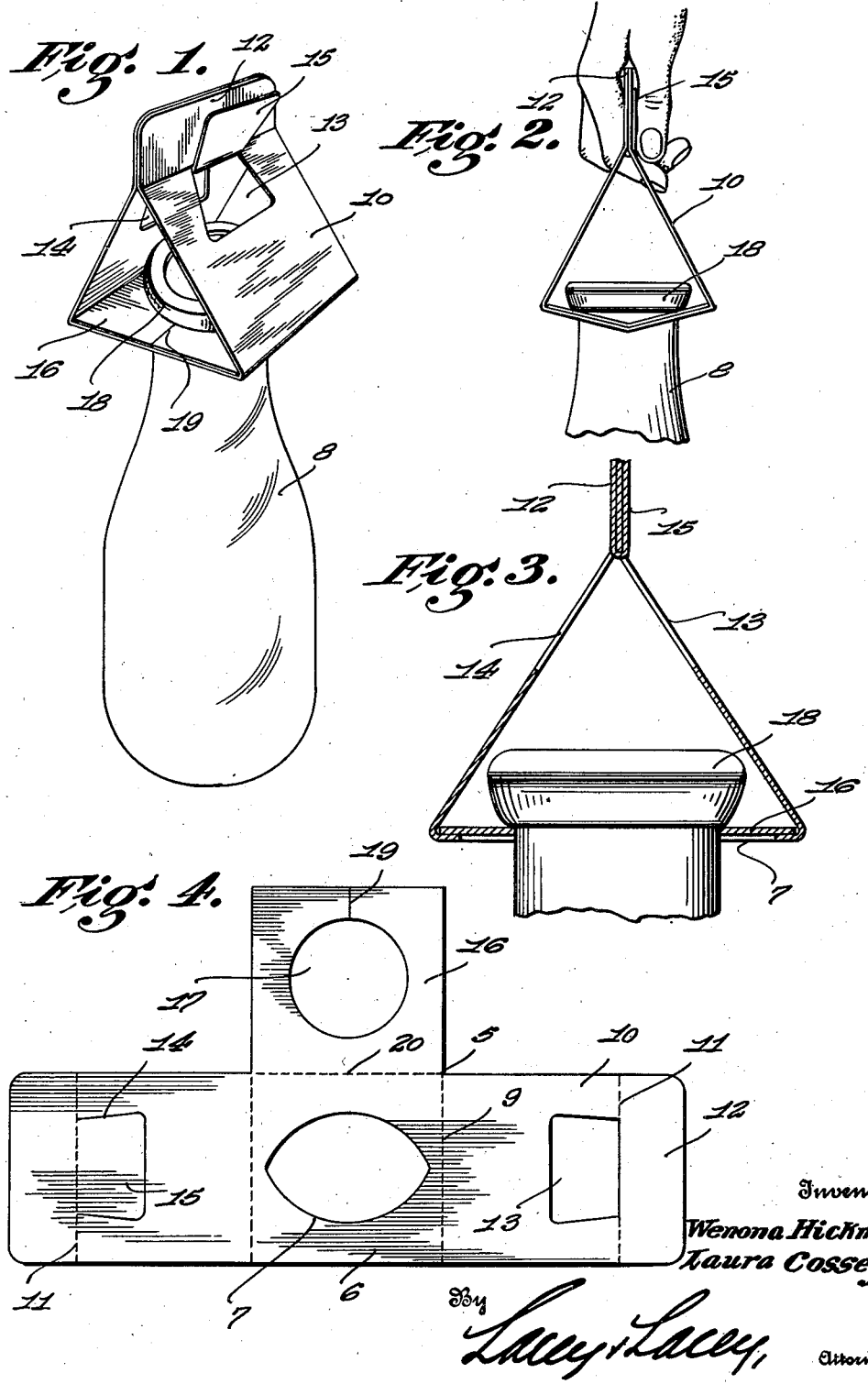

2,248,234

UNITED STATES PATENT OFFICE 2,248,234

INDIVIDUAL MILK BOTTLE CARRIER

Wenona Hickman and Laura Cossey, Danville, Ill.

Application February 29, 1940, Serial No. 321,564

9 Claims. (Cl. 215—100)

This invention relates to bottle carriers and more particularly to a device especially designed for carrying individual bottles of milk or other filled containers.

The object of the invention is to provide a bottle carrier of simple and inexpensive construction adapted to fit around the neck of a milk bottle or other container and by means of which individual bottles of milk may be conveniently carried from place to place or from a delivery wagon to a customer without danger of breaking the bottle and spilling the contents thereof.

A further object of the invention is to provide a milk bottle carrier, the construction of which is such that it can easily be slipped on or off the neck of a bottle by a person using the same and which possesses sufficient strength and durability to insure a large margin of safety against bottle breakage when used as a carrying agent.

A further object is to provide a bottle carrier which may be stamped, cut or otherwise constructed from a single sheet or blank folded in such a manner as to provide a central bottle neck-receiving portion and end flaps or walls constituting carrying handles, the central portion of the blank being provided with a transversely slit side flap foldable inwardly over the bottle-receiving portion and adapted to engage the bead or lip on the neck of a milk bottle.

A still further object of the invention is generally to improve this class of devices so as to increase their utility, durability and efficiency as well as to reduce the cost of manufacture.

In the accompanying drawings forming a part of this specification and in which similar numerals of reference indicate corresponding parts in all the figures of the drawings:

Figure 1 is a perspective view of a bottle carrier constructed in accordance with the present invention and showing the carrier in position on the neck of a milk bottle, Figure 2 is a side elevation showing the position assumed by the parts when subjected to the weight of a filled bottle of milk in the act of carrying the same, Figure 3 is an enlarged transverse sectional view of Figure 2 showing the position of the parts before being subjected to the weight of the bottle, Figure 4 is a plan view of the blank from which the carrier is constructed, Figure 5 is a plan view of a blank illustrating a modified form of the invention, Figure 6 is a plan view showing the position of the side flaps of the blank shown in Figure 5 after said flaps have been folded inwardly, Figure 7 is a transverse sectional view taken on the line 7—7 of Figure 6, and Figure 8 is a perspective view illustrating a further modification.

The improved bottle carrier forming the subject-matter of the present invention is preferably constructed of relatively stiff cardboard or other suitable material possessing the desired strength and durability, said cardboard being cut to form a single integral blank 5 of the construction shown in Figure 4 of the drawings. The blank 5 comprises a flat central portion 6 having a substantially elliptical shaped opening 7 formed therein and adapted to receive the neck of a bottle, indicated at 8. The blank 5 on opposite sides of the elliptical opening 7 is provided with transverse fold lines or weakened portions 9 defining end walls or flaps 10, there being other transverse fold lines 11 spaced from the fold lines 9 and defining terminal gripping portions or lips 12.

Formed in the end flaps 10 are substantially rectangular finger-receiving openings 13 and 14, one of which is adapted to receive a locking tab 15 formed by cutting the blank and pressing the material outwardly at the opening 14.

Extending laterally from one side of the blank at the central portion 6 thereof is a side flap 16 having a circular opening 17 formed therein and adapted to fit around the bead or lip 18 of the milk bottle. The free end of the side flap 16 is provided with a slit or incision 19 so that, when the flap 16 is folded inwardly on the line 20 over the central portion 6 of the blank, said flap is free to expand and thus permit it to easily fit over and around the bottle neck.

In folding the blank to form a carrier, the side flap 16 is first bent inwardly over the central portion 6, after which the end flaps 10 are folded toward each other on the lines 9 and the locking tab 15 extended through the opening 13. The neck of the bottle is then inserted within the elliptical opening 7 by slightly tilting said neck as it is introduced within the opening. The slit portion of the side flap 16 is then expanded laterally so as to allow the bead on the bottle neck to extend through the opening 17 when the side flap will contract and firmly grip the bottle beneath said bead. As the opening 17 is circular and the opening 7 elliptical, it follows that the flap 16, when moved to folded position, will effectually support the neck of the bottle and prevent the bottle from becoming accidentally detached from the holder. After the carrier has been positioned on the neck of a bottle, one or more fingers of the hand are inserted in the openings 13 and 14 with one of the fingers or the thumb pressing the locking tab 15 against the adjacent gripping portion or lip 12, as best shown in Figure 2 of the drawings, and in which position the bottle may be conveniently carried from place to place without danger of breaking the bottle and wasting the contents thereof.

It will be noted that, when the carrier is positioned on the neck of a bottle, the central portion 6 of the carrier and the side flap 16 will be disposed in a horizontal plane, as illustrated in Figure 3, but when the bottle is being carried from place to place, the weight of the contents of the bottle will depress said parts slightly, as shown in Figure 2, and in which position the end flaps 10 by engagement with the adjacent edges of the side flap 16 will exert a wedging action thereon and thus tend to cause the walls of the opening 17 in the side flap to firmly grip the bottle neck beneath the bead thereof.

Attention is called to the fact that the side flap 16 not only serves to grip and hold the bottle against displacement but materially strengthens the carrier and acts as a blotter to absorb moisture in case the neck of the bottle happens to be moist or wet, thereby preventing any excess moisture from penetrating the central portion 6 and weakening the same.

In Figures 5, 6 and 7 of the drawings, there is illustrated a modified form of the invention, in which the blank 21 is formed with oppositely disposed side flaps 22 each provided with a substantially semi-circular recess 23 opening through the free edge of the flap and adapted to register with each other when the side flaps are folded inwardly over the central portion of the blank on the fold lines 24 to the position shown in Figures 6 and 7 of the drawings, the construction and operation of the device being otherwise similar to that shown in Figure 1.

In Figure 8 of the drawings, there is illustrated a further modification in which the blank 24 is provided with a transversely slitted integral side flap 25 having a circular opening 26 formed therein and provided with an integral auxiliary flap 27. The auxiliary flap 27 is provided with a substantially semi-circular recess 28 which, when the flap 25 is folded over the central portion 29 of the blank, registers with the opening 26 and in this manner the auxiliary flap 27 serves to reinforce and strengthen the device and forms an additional support for engagement with the bead on the bottle neck, as will be readily understood.

It will, of course, be understood that the carriers may be made in different sizes and shapes and constructed of any suitable material without departing from the spirit of the invention.

It will further be understood that the end flaps or other portions of the carrier may have suitable advertising matter printed thereon indicating the name of the dairy or persons furnishing the milk or any other desired legend.

Having thus described the invention, what is claimed as new is:

1. A device of the class described comprising a carrying member having its intermediate portion provided with means for engagement with the bead on the neck of a bottle and its opposite ends formed with interengaging walls, and a flap disposed at one side of the carrier in overlapping relation to said intermediate portion and adapted to engage the neck of the bottle beneath said bead.

2. A device of the class described comprising a carrying member having its intermediate portion provided with a substantially elliptical shaped opening adapted to receive the neck of a bottle and its opposite ends formed with interengaging converging side walls, and a flap disposed at one side of the carrier in overlapping relation to said intermediate portion and provided with a substantially circular opening to receive said bottle neck.

3. A device of the class described comprising a carrying member having its intermediate portion provided with means for receiving the bead on the neck of a bottle and its opposite ends formed with interengaging converging walls, and a split flap disposed at one side of said carrier in overlapping relation to said intermediate portion and adapted to extend beneath said bead.

4. A device of the class described comprising a carrying member having its intermediate portion provided with means for engagement with the neck of a bottle and its opposite ends formed with interengaging converging walls terminating in gripping portions, there being a finger-receiving opening formed in one of said converging walls, a locking tab carried by the other wall and adapted to extend through said opening, and a transversely split flap disposed at one side of the carrier in overlapping relation to said intermediate portion and adapted to engage the neck of said bottle.

5. A device of the class described comprising a carrying member having its intermediate portion provided with a substantially elliptical shaped opening adapted to receive the bead on the neck of a bottle and its opposite ends formed with converging walls terminating in parallel gripping lips, a locking tab formed integral with one of said converging walls and adapted to extend through a finger opening formed in the other converging wall, a flap disposed at one side of the carrier in overlapping relation to said intermediate portion and having a substantially circular opening formed therein and a split portion intersecting said opening, the converging walls of the carrier by engagement with the adjacent edges of the flap serving to clamp the walls of the circular opening around the neck of the bottle beneath the bead thereon.

6. A carrier for milk bottles formed from a single blank divided by transverse fold lines to form an intermediate portion and integral end portions, said intermediate portion having a substantially elliptical shaped opening formed therein, and a flap extending laterally from one side of the blank at said intermediate portion and provided with a substantially circular opening adapted to register with the elliptical opening when the flap is folded inwardly over said intermediate portion.

7. A bottle carrier formed from a single blank and comprising an intermediate portion having a substantially elliptical shaped opening formed therein and integral end portions adapted to be folded upwardly, the end portions of the blank being provided with finger-receiving openings, a locking tab disposed at one of said openings and adapted to extend through the other opening, and a flap extending laterally from one side of the intermediate portion of the blank and provided with a substantially circular opening adapted to register with the elliptical opening when the flap is folded inwardly over said intermediate portion, there being an incision formed in the flap and intersecting the circular opening.

8. A bottle carrier comprising a blank provided with transverse fold lines defining an intermediate portion and integral end portions, the intermediate portion having a substantially elliptical shaped opening formed therein, auxiliary transverse fold lines formed on the end portions and defining terminal gripping lips, one of said end portions being provided with an incision defining a locking tab and the other end portion formed with an opening adapted to receive said locking tab, and a flap extending laterally from the intermediate portion of the blank and provided with a substantially circular opening and a slit intersecting said opening.

9. A device of the class described comprising a carrying member adapted to receive the bead on the neck of a bottle and provided with interengaging walls constituting carrying arms, and a flap disposed at one side of the carrying member in overlapping relation thereto and adapted to fit beneath said bead whereby when the bottle is being carried the weight of the contents of the bottle will cause the carrying arms to engage the adjacent portions of the side flap and clamp said side flap against the bottle neck below said bead.

WENONA HICKMAN.
LAURA COSSEY.